US009797183B2

(12) United States Patent
Flick

(10) Patent No.: US 9,797,183 B2
(45) Date of Patent: Oct. 24, 2017

(54) MULTI-CONTROLLER DATA BUS ADAPTOR OPERABLE BASED UPON DATA BUS ADAPTOR COMMUNICATION DETERMINED ADAPTOR CODES AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 254 days.

(21) Appl. No.: 14/624,712

(22) Filed: Feb. 18, 2015

(65) Prior Publication Data

US 2016/0237734 A1 Aug. 18, 2016

(51) Int. Cl.

*G08C 17/02* (2006.01)
*B60R 16/03* (2006.01)
*E05F 15/77* (2015.01)

(52) U.S. Cl.

CPC .............. *E05F 15/77* (2015.01); *G08C 17/02* (2013.01)

(58) Field of Classification Search

CPC ....... B60R 25/04; B60R 25/209; B60R 16/03; B60R 25/1001; G08C 17/02; G08G 1/096716
USPC ............... 701/2; 340/357.31, 426.14, 426.17
See application file for complete search history.

(56) References Cited

U.S. PATENT DOCUMENTS 4,383,242 A 5/1983 Sassover et al.
5,086,288 A * 2/1992 Stramer .................. B60R 25/04 307/10.3
5,146,215 A 9/1992 Drori
5,252,966 A 10/1993 Lambropoulos et al.
6,100,792 A * 8/2000 Ogino ................. B60R 25/1001 340/12.54
6,249,216 B1 * 6/2001 Flick ....................... B60R 16/03 180/287
6,346,876 B1 * 2/2002 Flick ....................... B60R 16/03 180/287
6,756,885 B1 * 6/2004 Flick ....................... B60R 25/04 180/287
8,032,278 B2 10/2011 Flick
8,362,886 B2 1/2013 Flick
(Continued)

*Primary Examiner* — Yuri Kan
(74) *Attorney, Agent, or Firm* — Allen, Dyer, Doppelt, + Gilchrist, P.A. Attorneys at Law

(57) ABSTRACT

A remote control system may be for a vehicle including a data communications bus and connecting vehicle devices. The vehicle devices may be operable with a set of vehicle device codes from among different sets thereof for different vehicles. A vehicle controller may be responsive to the remote transmitter and may include a controller data link interface. A data bus adaptor may store the set of vehicle device codes and include an adaptor data link interface cooperating with the controller data link interface to provide a communication link for adapting the vehicle controller to communicate with a vehicle device via the data communications bus. The data bus adaptor may be operable based upon a set of adaptor codes from among different sets thereof. The vehicle controller may include an adaptor code determining circuit for determining the set of adaptor codes based upon communication with the data bus adaptor.

31 Claims, 3 Drawing Sheets

(56) References Cited

U.S. PATENT DOCUMENTS

| | | | | | |
|---|---|---|---|---|---|
| 2001/0029415 | A1* | 10/2001 | Flick | B60R 16/03 | 701/36 |
| 2007/0058625 | A1* | 3/2007 | Fushiki | G08G 1/096716 | 370/389 |
| 2007/0279283 | A1* | 12/2007 | Flick | B60R 25/04 | 342/357.31 |
| 2009/0079552 | A1* | 3/2009 | Flick | B60R 25/209 | 340/426.17 |

* cited by examiner

MULTI-CONTROLLER DATA BUS ADAPTOR OPERABLE BASED UPON DATA BUS ADAPTOR COMMUNICATION DETERMINED ADAPTOR CODES AND RELATED METHODS

TECHNICAL FIELD

The present application is related to the field of control systems, and, more particularly, to vehicle control systems and related methods.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle. The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulos et al. discloses a remote keyless entry system for a vehicle. The keyless entry system permits the user to remotely open the vehicle doors or open the vehicle trunk using a small handheld transmitter.

In addition to vehicle security and remote keyless entry functions, another type of desirable vehicle remote control function is remotely starting the vehicle engine when the owner is away from the vehicle. Such remote starting can be used in cold climates to warm the engine and/or run the passenger compartment heater, to thereby prevent freezing or for the user's comfort. Conversely, remote engine starting can enable the air conditioning to run to cool the vehicle's interior before the vehicle user enters the vehicle.

Unfortunately, many older vehicle security systems needed to be directly connected by wires to individual vehicle devices, such as the vehicle horn or door switches of the vehicle. In other words, older conventional vehicle security systems were hard-wired to various vehicle components, typically by splicing into vehicle wiring harnesses or via interposing T-harnesses and connectors. More recently, vehicle manufacturers have moved to decrease the wiring complexity by using one or more data buses extending throughout the vehicle and interconnecting various vehicle devices. Moreover, the assignee of the present invention has made a number of significant developments in the vehicle data bus area, particularly as may be helpful to the adaptation of aftermarket vehicle remote control systems to vehicles including a data bus. For example, some of these innovations are disclosed in U.S. Pat. Nos. 6,756,885 and 6,346,876, the entire disclosures of which are incorporated herein by reference.

Indeed one of the significant advances disclosed in the Flick patents is the concept of a multi-vehicle compatible controller that may be provided by using a conventional remote control device coupled to the data bus by a data bus adaptor device. The data bus adaptor device is able to translate the codes or language generated by the vehicle devices on the data bus into a format that may be read by the remote control device, and/or is able to translate command information or codes from the remote control device into data bus codes to control the vehicle devices.

Despite the advances provided by the migration of manufacturers to vehicle data bus technology, and the significant advances provided by the Flick patents for multi-vehicle compatibility with the data bus, there are still other compatibility shortcomings that may need further efforts. In particular, manufacturers of aftermarket security and remote start systems may be using proprietary output formats, such as in the form of coded serial outputs that will interface with their own data bus modules, but not with the data bus modules of other manufacturers.

SUMMARY

A remote control system may be for a vehicle of a type including a data communications bus extending throughout the vehicle and connecting a plurality of vehicle devices within the vehicle. The vehicle devices may be operable with a given set of vehicle device codes from among a plurality of different sets of vehicle device codes for different vehicles. The remote control system may include a vehicle controller being responsive to a remote transmitter and comprising a controller data link interface, and a data bus adaptor having stored therein the given set of vehicle device codes. The data bus adaptor may include an adaptor data link interface cooperating with the controller data link interface to provide a communication link for adapting the vehicle controller to communicate with at least one vehicle device via the data communications bus. The data bus adaptor may be operable based upon a given set of adaptor codes from among a plurality of different sets of adaptor codes for different adaptors. The vehicle controller may include an adaptor code determining circuit for determining the given set of adaptor codes based upon communication with the data bus adaptor. Accordingly, the remote control system may provide communication between the data link adaptor and the vehicle controller for providing an interface between the remote transmitter and the vehicle devices, for example.

The adaptor code determining circuit may determine the given set of adaptor codes based upon at least one code received from the data bus adaptor, for example. The vehicle controller may include a processor and a memory coupled thereto for storing the given set of adaptor codes. The data bus adaptor may include a processor and a memory coupled thereto for storing the given set of vehicle device codes.

The controller link interface and the adaptor link interface may establish a serial communication link therebetween, for example. The vehicle controller may include a vehicle positioning determining device, at least one wireless communications device, and a processor coupled to the vehicle position determining device, the wireless communications device, and the controller data link interface. The processor may cooperate with the vehicle position determining device and the at least one wireless communications device to wirelessly send vehicle position information, for example.

The vehicle controller may be for performing a vehicle starting function responsive to the remote transmitter. The vehicle controller may be for performing a vehicle security function responsive to the remote transmitter, for example. The vehicle controller may be for performing a vehicle convenience function responsive to the remote transmitter.

The data bus adaptor may include an adaptor download interface for downloading the given set of vehicle device codes. The vehicle controller may include a controller housing and controller circuitry carried thereby, and the data bus adaptor may include an adaptor housing and adaptor circuitry carried thereby, for example.

A method aspect is directed to a method of using a remote control system for a vehicle of a type including a data communications bus extending throughout the vehicle and connecting a plurality of vehicle devices within the vehicle. The vehicle devices may be operable with a given set of vehicle device codes from among a plurality of different sets of vehicle device codes for different vehicles. The remote control system may include a vehicle controller being responsive to a remote transmitter and including a controller data link interface, and a data bus adaptor having stored therein the given set of vehicle device codes and comprising an adaptor data link interface cooperating with the controller data link interface to provide a communication link for adapting the vehicle controller to communicate with at least one vehicle device via the data communications bus. The data bus adaptor may be operable based upon a given set of adaptor codes from among a plurality of different sets of adaptor codes for different adaptors. The vehicle controller may include an adaptor code determining circuit. The method may include using the vehicle controller with the given set of adaptor codes determined from the adaptor code determining circuit based upon communication with the data bus adaptor to operate the data bus adaptor.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
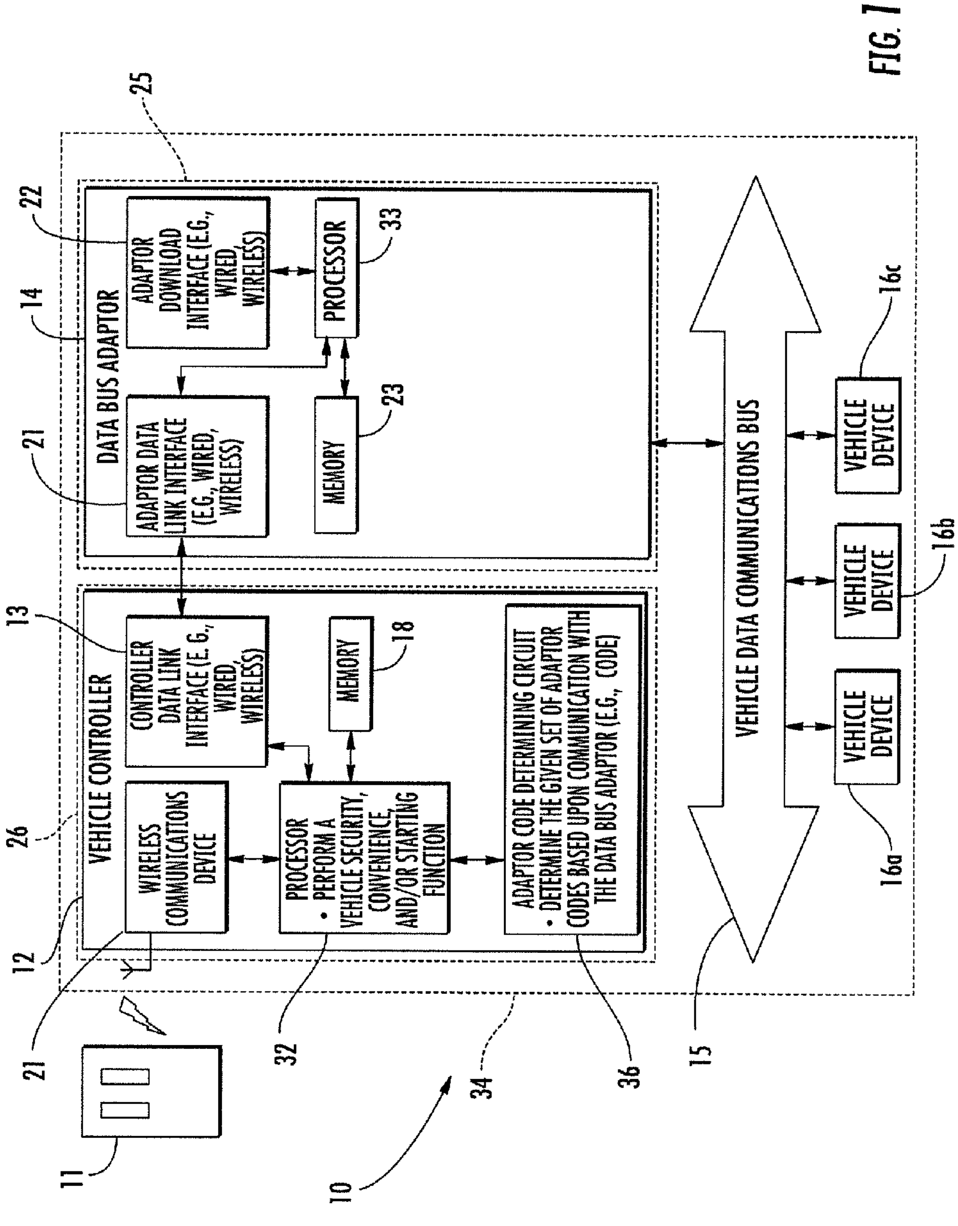
FIG. 1 is a schematic block diagram of a remote control system in accordance with the present invention.

Referring initially to FIG. 1, a remote control system 10 for a vehicle illustratively includes a data communications bus 15 extending throughout the vehicle and connecting a plurality of vehicle devices **16*a*-16*c* within the vehicle 34. For example, such vehicle devices 16*a*-16*c* may be associated with starter motor relays, headlight relays, sirens, the body control module, the engine control module, the powertrain control module, and/or one or more vehicle sensors. Those skilled in the art will recognize other vehicle devices that may be connected to the data bus 15**.

The remote control system 10 illustratively includes a remote transmitter 11 and a vehicle controller 12 being responsive to the remote transmitter. The remote transmitter 11 may be a small portable unit including a housing, function control switches carried by the housing, a battery within the housing, and the associated transmitter circuitry. This type of remote handheld transmitter is commonly used in conventional vehicle security systems, remote start systems, and remote keyless entry systems. The communications from the remote transmitter 11 to the vehicle controller 12 at the vehicle is typically a direct radio frequency link, that is, there is no intervening communications links. However, in other embodiments, the remote transmitter 11 may indirectly communicate with the vehicle controller 12 via other communications infrastructure, such as via satellite, or cellular communications, via the public switched telephone network (PSTN) and/or over the world wide web or Internet, as will be appreciated by those skilled in the art.

The remote transmitter 11 may also include one or more central station transmitters, such as may be provided by a satellite transmitter or cellular telephone transmitter, for example. Such a central station transmitter may also be connected to other communications infrastructure as will be appreciated by those skilled in the art.

The vehicle controller 12 includes controller circuitry carried by a controller housing 26. The controller circuitry includes a wireless communications device 31 and a processor 32 coupled thereto. The processor 32 is coupled to a controller data link interface 13 that, in turn, is connected to the data bus adaptor 14. A vehicle controller memory 18 is also coupled to the processor 32. Although the vehicle controller memory 18 is illustrated as a separate device, those skilled in the art will recognize that the memory may alternatively be embedded on the same integrated circuit as the processing circuitry of the vehicle controller processor 32. The wireless communications device 31 may include one or more transmitters and/or receivers for communicating at different frequencies, or different formats, for example.

Figure 2:
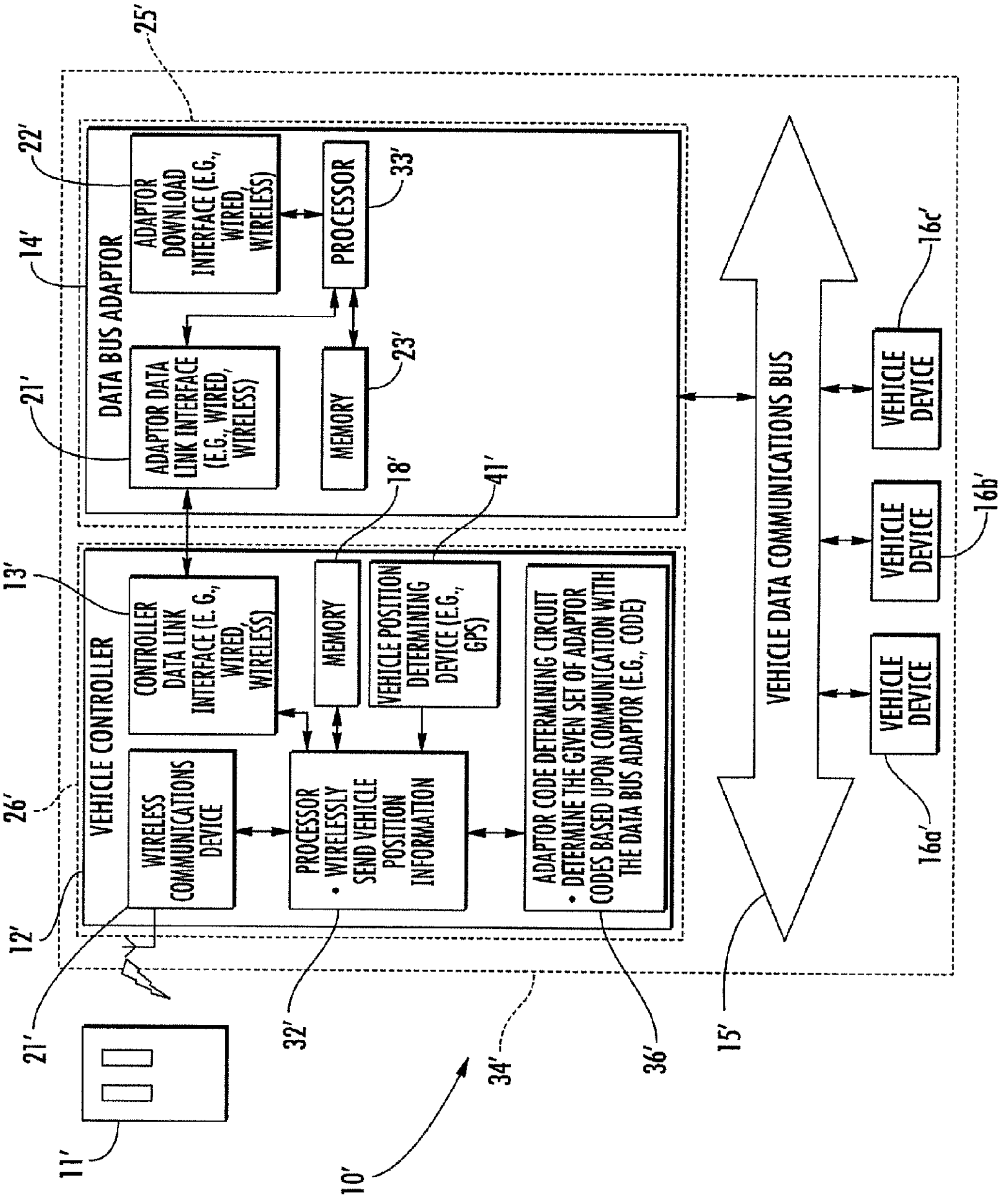
FIG. 2 is a schematic block diagram of a remote control system in accordance another embodiment of the present invention.

Referring now to FIG. 2, in another embodiment, the vehicle controller 12' may also include a vehicle position determining device 41' coupled to the processor 32'. The processor 32' may cooperate with the vehicle position determining device 41', for example, a GPS receiver, and the wireless communications device 31' to wirelessly send vehicle position information. The vehicle position information may be received by a remote device remotely from the vehicle, for example, by a central monitoring station or mobile device (e.g., cellular telephone). The wireless communications device 31' may cooperate with the processor 32' to receive and process commands from the remote device, for example, to remotely control one of the vehicle devices **16*a*'-16*c*'**.

Referring again to FIG. 1, the vehicle controller 12, and more particularly, the vehicle controller processor 32 may be configured to cooperate with one or more vehicle devices **16*a*-16*c* to perform a vehicle starting function responsive to the remote transmitter 11. The vehicle controller 12 may also be also be for performing a vehicle security function such as arming a vehicle alarm system and/or a vehicle convenience function, for example, opening the windows or locking the doors. Of course, the vehicle controller 12** may perform other and/or additional functions.

The data bus adaptor 14 illustratively includes an adaptor housing 25 and adaptor circuitry carried by the adaptor housing. The data bus adaptor circuitry illustratively includes a data bus adaptor processor 33 coupled between a data adaptor download interface 22 and an adaptor data link interface 21. The data bus adaptor 14 is for adapting the vehicle controller 12 to communicate via the data communications bus 15. The adaptor data link interface 21 is coupled to the data bus adaptor processor 33 and cooperates therewith to perform communication with the controller data link interface 13. More particularly, the adaptor link interface 21 cooperates with the controller data link interface 13 to provide a communication link for adapting the vehicle controller 12 to communicate with the vehicle devices 16*a*-16*c* via the data communications bus 15.

Communication between the controller data link interface 13 and the adaptor data link interface 21 (i.e., the communication link) may be a serial data communications link. The serial data communications link is often a proprietary digital link for each manufacturer of the vehicle remote function controller. The controller data link interface 13 may be a wired controller data link interface, and the adaptor data link interface 21 may be a wired adaptor data link interface such that a wired communication link is established therebetween. In other embodiments, the controller data link interface 13 may be a wireless controller data link interface, and the adaptor data link interface 21 may be a wireless adaptor data link interface. Thus, a wireless communication link, such as a Bluetooth link, is established therebetween. The vehicle controller 12 is advantageously operable with a given set of adaptor codes from among different sets of adaptor codes for different adaptors 14 to thereby provide compatibility with different manufacturers.

The given set of adaptor codes is determined by an adaptor code determining circuit 36 of the vehicle controller 12. The adaptor code determining circuit 36 is coupled to the vehicle processor 32 and determines the given set of adaptor codes based upon communications with the data bus adaptor. For example, the adaptor code determining circuit 36 may determine the given set of adaptor codes from one or more codes received by the data bus adaptor. The given set of adaptor codes may be stored in the vehicle controller memory 18. For example, the adaptor code determining circuit 36 and the vehicle controller processor 32 may cooperate to compare a received data bus adaptor code to those already stored in a look-up table in the vehicle controller memory 18 to thereby identify the particular manufacturer and/or code set being used by the data bus adaptor 14. Alternatively, the communication with data bus adaptor 13 may include some other identifying code, voltage level, or other protocol characteristic that permits the adaptor code determining circuit 36 to determine the proper code set. While the adaptor code determining circuit 36 and the vehicle controller processor 32 have been described as separate devices, it should be appreciated that the functions of the adaptor code determining circuit may be performed by the vehicle controller processor or be part of the same circuitry.

Turning now to another advantageous feature of the system 10, the vehicle 34 may operate with a desired set of vehicle device codes from among a plurality of different sets of vehicle device codes for different vehicles. The vehicle device codes may be unique to each vehicle or vehicle manufacturer. Advantageously, the data bus adaptor 14 may include an adaptor download interface 22 for downloading the given set of the vehicle device codes. The adaptor download interface 22 may be wired or wireless. The vehicle device codes may be downloaded prior to installation in the vehicle 34, for example.

Vehicle device codes from among a plurality of different sets of vehicle device codes for vehicles can be stored in a data bus adaptor memory 23 of the data bus adaptor 14. The memory 23 may be a plug-in IC, a PROM chip, a removable FLASH memory, or any other memory, as will be appreciated by those skilled in the art. Although the data bus adaptor memory 23 is illustrated as a separate device, those skilled in the art will recognized that the memory may alternately be embedded on the same integrated circuit as the processing circuitry of the data bus adaptor processor 33.

Figure 3:
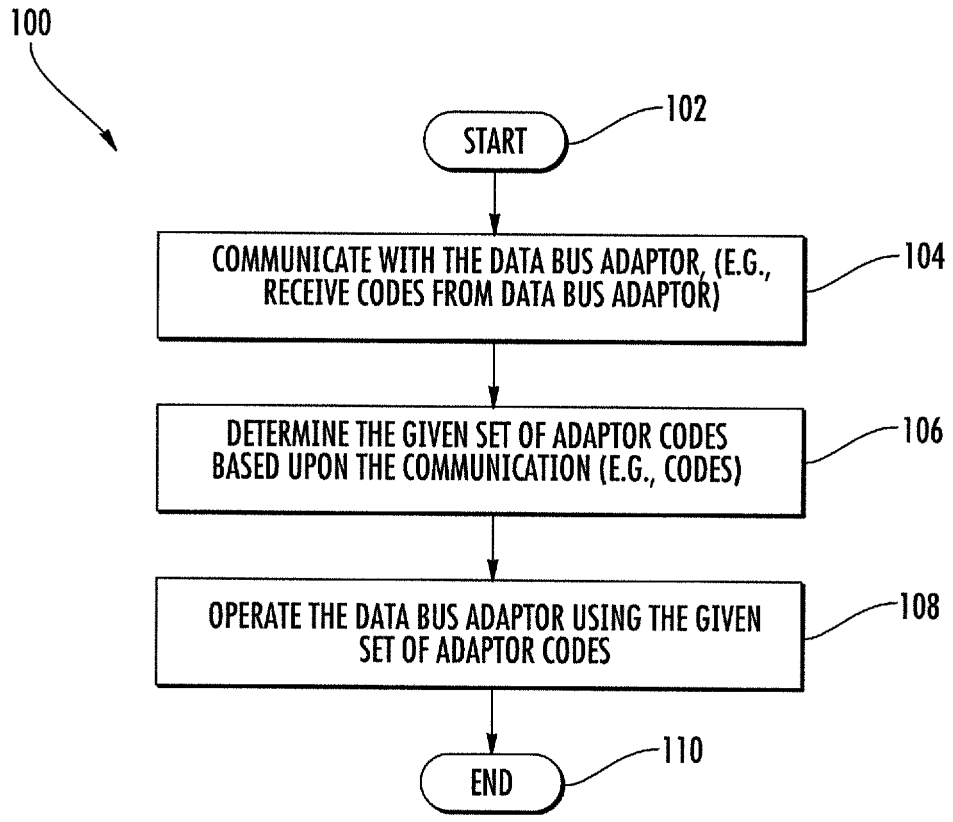
FIG. 3 is a flow chart of a method of operating a remote control system in accordance with an embodiment of the present invention.

Turning now additionally to the flowchart 100 of FIG. 3, a method aspect is described relating to operating the remote control system 10. After the start at Block 102, codes, for example, adaptor codes are read or received from the data bus adaptor 14 (Block 104). Based on the codes, a corresponding set of adaptor codes are determined based upon the adaptor code determining circuit 36 (Block 106). For example, the received code may be compared to sets of adaptor codes stored in the vehicle controller memory 18 to determine which set is to be used. The vehicle controller 12 operates the data bus adaptor 14 based using the given set of adaptor codes (Block 108). The method ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that, modifications and embodiments are intended to be included within the scope of the appended claims.

That which is claimed is:

1. A remote control system for a vehicle of a type including a data communications bus extending throughout the vehicle and connecting a plurality of vehicle devices within the vehicle, the vehicle devices operable with a given set of vehicle device codes from among a plurality of different sets of vehicle device codes for different vehicles, the remote control system comprising:

a vehicle controller being responsive to a remote transmitter and comprising a controller data link interface; and a data bus adaptor having stored therein the given set of vehicle device codes and comprising an adaptor data link interface cooperating with said controller data link interface to provide a communication link for adapting said vehicle controller to communicate with at least one vehicle device via the data communications bus, said data bus adaptor being operable based upon a given set of adaptor codes from among a plurality of different sets of adaptor codes for different adaptors;

said vehicle controller comprising an adaptor code determining circuit for determining the given set of adaptor codes based upon communication with said data bus adaptor.

2. The remote control system of claim 1 wherein said adaptor code determining circuit determines the given set of adaptor codes based upon at least one code received from said data bus adaptor.

3. The remote control system of claim 1 wherein said vehicle controller comprises a processor and a memory coupled thereto for storing the given set of adaptor codes.

4. The remote control system of claim 1 wherein said data bus adaptor comprises a processor and a memory coupled thereto for storing the given set of vehicle device codes.

5. The remote control system of claim 1 wherein said controller data link interface and said adaptor link interface establish a serial communication link therebetween.

6. The remote control system of claim 1 wherein said controller data link interface comprises a wireless controller data link interface, and said adaptor data link interface comprises a wireless adaptor data link interface to establish a wireless communication link therebetween.

7. The remote control system of claim 1 wherein said controller data link interface comprises a wired controller data link interface, and said adaptor data link interface comprises a wired adaptor data link interface to establish a wired communication link therebetween.

8. The remote control system of claim 1 wherein said vehicle controller comprises:

a vehicle positioning determining device;

at least one wireless communications device; and a processor coupled to said vehicle position determining device, said wireless communications device, and said controller data link interface.

9. The remote control system of claim 8 wherein said processor cooperates with said vehicle position determining device and said at least one wireless communications device to wirelessly send vehicle position information.

10. The remote control system of claim 1 wherein said vehicle controller is for performing a vehicle starting function responsive to the remote transmitter.

11. The remote control system of claim 1 wherein said vehicle controller is for performing a vehicle security function responsive to the remote transmitter.

12. The remote control system of claim 1 wherein said vehicle controller is for performing a vehicle convenience function responsive to the remote transmitter.

13. The remote control system of claim 1 wherein said data bus adaptor comprises an adaptor download interface for downloading the given set of vehicle device codes.

14. The remote control system of claim 1 wherein said vehicle controller comprises a controller housing and controller circuitry carried thereby; and wherein said data bus adaptor comprises an adaptor housing and adaptor circuitry carried thereby.

15. A vehicle controller for a remote control system comprising a data bus adaptor having stored therein a given set of vehicle device codes for operating a plurality of vehicle devices and comprising an adaptor data link interface for adapting the vehicle controller to communicate with at least one vehicle device via a data communications bus extending throughout a vehicle, the data bus adaptor being operable based upon a given set of adaptor codes from among a plurality of different sets of adaptor codes for different adaptors, the vehicle controller comprising:

a controller data link interface to be coupled to the adaptor data link interface;

a processor coupled to said controller data link interface and operable to communicate with the at least one vehicle device via the data communications bus based upon the given set of adaptor codes; and an adaptor code determining circuit coupled to said processor for determining the given set of adaptor codes based upon communication with said data bus adaptor.

16. The vehicle controller of claim 15 wherein said adaptor code determining circuit determines the given set of adaptor codes based upon at least one code received from the data bus adaptor.

17. The vehicle controller of claim 15 further comprising a memory coupled to said processor for storing the given set of adaptor codes.

18. The vehicle controller of claim 15 wherein said controller data link interface comprises a wireless controller data link interface, and the adaptor link interface comprises a wireless adaptor link interface to establish a wireless communication link therebetween.

19. The vehicle controller of claim 15 wherein said controller data link interface comprises a wired controller data link interface, and the adaptor data link interface comprises a wired adaptor data link interface to establish a wired communication link therebetween.

20. The vehicle controller of claim 16 further comprising:

a vehicle positioning determining device coupled to said processor; and at least one wireless communications device coupled to said processor.

21. The vehicle controller of claim 20 wherein said processor cooperates with said vehicle position determining device and said at least one wireless communications device to wirelessly send vehicle position information.

22. A method of using a remote control system for a vehicle of a type including a data communications bus extending throughout the vehicle and connecting a plurality of vehicle devices within the vehicle, the vehicle devices operable with a given set of vehicle device codes from among a plurality of different sets of vehicle device codes for different vehicles, the remote control system comprising a vehicle controller being responsive to a remote transmitter and comprising a controller data link interface, a data bus adaptor having stored therein the given set of vehicle device codes and comprising an adaptor data link interface cooperating with the controller data link interface to provide a communication link for adapting the vehicle controller to communicate with at least one vehicle device via the data communications bus, the data bus adaptor being operable based upon a given set of adaptor codes from among a plurality of different sets of adaptor codes for different adaptors, the vehicle controller comprising an adaptor code determining circuit, the method comprising:

using the vehicle controller with the given set of adaptor codes determined from the adaptor code determining circuit based upon communication with the data bus adaptor to operate the data bus adaptor.

23. The method of claim 22 wherein the given set of adaptor codes is determined based upon at least one code received from the data bus adaptor.

24. The method of claim 22 wherein the controller data link interface comprises a wireless controller data link interface, and the adaptor link interface comprises a wireless adaptor link interface to establish a wireless communication link therebetween.

25. The method of claim 22 wherein the controller download interface comprises a wired controller download interface, and the adaptor link interface comprises a wired adaptor link interface to establish a wired communication link therebetween.

26. The method of claim 22 wherein the vehicle controller comprises a processor and a memory coupled thereto for storing the given set of adaptor codes.

27. The method of claim 22 wherein the data bus adaptor comprises a processor and a memory coupled thereto for storing the given set of vehicle device codes.

28. The method of claim 22 wherein the controller data link interface and the adaptor link interface establish a serial communication link therebetween.

29. The method of claim 22 wherein using the vehicle controller comprises using the vehicle controller for performing a vehicle starting function responsive to the remote transmitter.

30. The method of claim 22 wherein using the vehicle controller comprises using the vehicle controller for performing a vehicle security function responsive to the remote transmitter.

31. The method of claim 22 wherein using the vehicle controller comprises using the vehicle controller for performing a vehicle convenience function responsive to the remote transmitter.

* * * * *